United States Patent [19]

Bahr et al.

[11] Patent Number: 4,932,794
[45] Date of Patent: Jun. 12, 1990

[54] BEARING SEGMENT FOR TRUNNION BEARINGS

[75] Inventors: Theodor Bahr, Heidenheim; Heinz Keck, Zang, both of Fed. Rep. of Germany

[73] Assignee: J. M. Voith GmbH, Heidenheim, Fed. Rep. of Germany

[21] Appl. No.: 367,381

[22] Filed: Jun. 16, 1989

[30] Foreign Application Priority Data

Jun. 22, 1988 [DE] Fed. Rep. of Germany ....... 3821008

[51] Int. Cl.$^5$ .............................................. F16C 17/02
[52] U.S. Cl. ..................................... 384/99; 384/263; 384/273; 384/280
[58] Field of Search ................. 384/99, 221, 280, 273, 384/263, 266

[56] References Cited

U.S. PATENT DOCUMENTS

| | | | |
|---|---|---|---|
| 4,607,964 | 8/1986 | Kramer et al. | 384/263 |
| 4,708,758 | 11/1987 | McGregor | 384/221 |
| 4,749,282 | 6/1988 | Spargo et al. | 384/99 |

FOREIGN PATENT DOCUMENTS 663245 7/1938 Fed. Rep. of Germany .

Primary Examiner—Lenard A. Footland
Attorney, Agent, or Firm—Jeffers, Hoffman & Niewyk

[57] ABSTRACT

The bearing segment consists of individual lamella (2) that are parallel to the bearing axis and can be forced on the trunnion of the workpiece by means of hydraulic fluid contained in a piston space. This makes it possible to cover a certain diameter range of the trunnions of the workpieces with a single bearing segment, and modified bearing segments are required only in keeping with the jumps in bearing diameters.

20 Claims, 1 Drawing Sheet

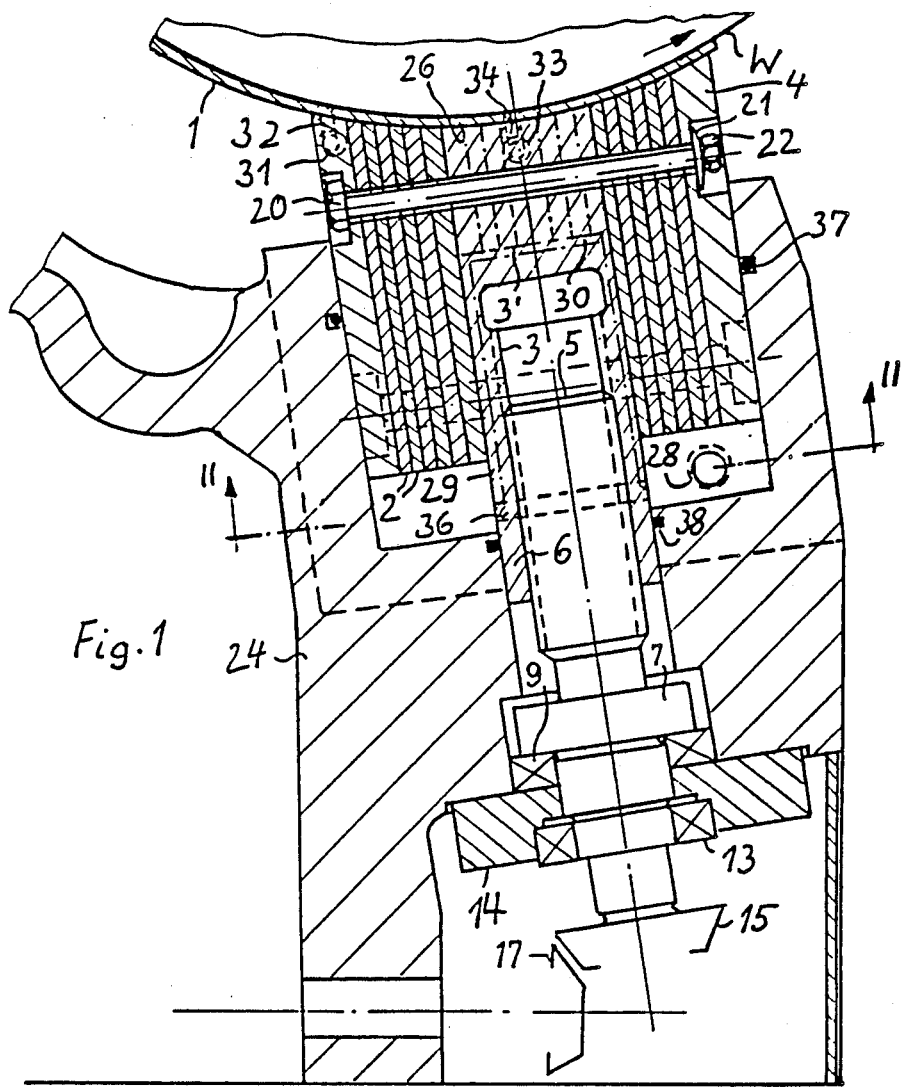
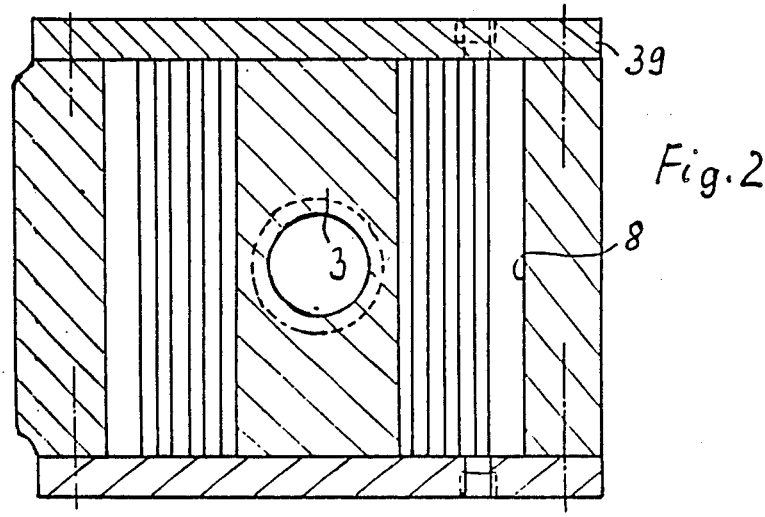

BEARING SEGMENT FOR TRUNNION BEARINGS

BACKGROUND OF THE INVENTION

Known from the German patent document No. 663,245 are prior radial bearings where the support body consists of individual lamella that are parallel to one another and whose parting planes are perpendicular to the bearing axis. A lubricant is passed to the bearing face through grooves or interspersed absorbent rings. The individual lamella are provided with a cylindrical bore and, in their entirety, constitute the bearing face. Reliability is achieved in a simple way for small, inexpensive bearings which are extensively free of maintenance.

The problem underlying the present invention is to provide a trunnion bearing for a workpiece with a cylindrical surface, which bearing can be used for a certain bearing diameter range without requiring design modifications. This problem is inventionally solved through the features of the present invention.

SUMMARY OF THE INVENTION

The present invention, in accordance with one aspect thereof, involves a trunnion bearing segment having a bearing axis for supporting a trunnion of a workpiece in a machine tool. Included is a lamella packet having a plurality of parallel individual lamella, the individual lamella being arranged parallel to a plane extending parallel to and through the bearing axis of the bearing segment. A housing means is provided having a piston space in which is received the lamella packet and hydraulic fluid. An easily deformable bearing shell is supported by the lamella packet and is molded to the trunnion of the workpiece.

BRIEF DESCRIPTION OF THE DRAWINGS

The invention will be explained hereafter with the aid of embodiments illustrated in the figures, in which FIG. 1 shows a cross-section of a first embodiment of the trunnion bearing; and FIG. 2 shows a partial plan view and a pertaining cross-section.

DESCRIPTION OF THE PREFERRED EMBODIMENTS

The inventional bearing segment consists of individual lamella 2 that are parallel to one another and extend parallel to the bearing axis or axis of the workpiece, for instance a roll W. This lamella packet is centrally divided by a center support 3. The lamella packet and center support 3 have a bearing face that equals a cylinder sector and is dimensioned for an average bearing radius. The actual bearing face is formed by a thin bearing shell 1 from flexible material. It may be a steel sheet coated with babbitt metal or also a shell from very resistant plastic which is equipped also with good sliding properties for emergency operation (for instance, synthetic resin reinforced with carbon or aramid fibers). The lamella packet is installed in a space 8 and is reinforced by lateral backing plates 4. The lamella packet is held together with the backing plates by means of tightening bolts 20 which compress the lamella packet by means of disk springs 21 and nuts 22. The lamella packet and center support 3 together form a unit. But the center support 3 is movable to a certain extent relative to the lamella in the direction of bearing force. The center support changes at 36 from a cylindrical part 6 to a part of rectangular shape which completely fills the space between the lamella.

The center support 3 can be adjusted by means of a spindle 5—here a bevel gear set with bevel gears 15 and 17—which engages a bore 16 in the center support. The spindle 5 bears by means of a collar 7 and bearing 9 on the housing 24 of the support. Another bearing 13 of the spindle 5 rests on a support plate 14. The bearing 9 is preferably a roller bearing and the bearing 13 an angular ball bearing. The driving bevel gear 17 is mounted on a shaft 19 (indicated here by dash-dot line) which can be turned, e.g., by means of a handwheel (not illustrated here).

The part of the space 8 that is not occupied by the lamella 2 and backing plates 4 serves as a piston space and is filled with hydraulic fluid. The workpiece—for instance a roll—is first set on the center support 3 and aligned, whereafter a complete support for the grinding operation—in the case of a grinder—is brought about by admitting hydraulic pressure on the lamella packet. Viewed across the circumference of the trunnion, there is still another bearing segment arranged which has a structure similar to that of the illustrated bearing and serves to provide lateral guidance for the workpiece. The bearing shell 1 extends up to this additional bearing segment, which here is not illustrated in detail. The illustrated trunnion bearing can be used for a diameter range of about 50 mm difference, so that for the respective jumps in diameter a new lamella packet would need to be available for each bearing segment. The hydraulic fluid space is sealed on the lamella packet by means of an O-ring 37 and on the center support 3 by means of an O-ring 38. The space 8 is defined by lateral plates 39 which by means of screws marked or indicated in their position by dash-dot center lines are mounted on the housing 24.

FIG. 1 also shows by dash-dot lines that the lamella packet need not be interrupted by a center support 3' but that shorter lamella 26 may be contained in its area. By means of recesses 29 and 30 which are provided in the center support 3' it is possible to admit hydraulic fluid also on these lamella. Upon admission of the hydraulic fluid, e.g., the center support 3' may be somewhat retracted allowing the hydraulic pressure to fully proceed underneath the shorter lamella 26. This results in a continuous, still better support of the bearing shell 1 with different bearing diameters.

Lastly it would be possible, at least for an upper bearing segment, which needs to apply only relatively low bearing forces, to arrange the so-called center support also sideways, that is, sideways beside all of the lamella 2 in the space 8.

The feeding of hydraulic fluid for the piston space is indicated by the bore 28. The hydraulic fluid for hydrostatic pressure relief and/or bearing lubrication is indicated by bores 31, 32, 33 and 34, with the workpiece W (roll) rotating in the direction indicated by the arrow.

What is claimed is:

1. A trunnion bearing segment having a bearing axis for supporting a trunnion of a workpiece in a machine tool, comprising:

- a lamella packet including a plurality of parallel individual lamella, said individual lamella being arranged parallel to a plane extending parallel to and through the bearing axis of the bearing segment;
- housing means having a piston space in which is received said lamella packet and hydraulic fluid; and an easily deformable bearing shell supported by the lamella packet and molded to the trunnion of the workpiece.

2. The trunnion bearing segment according to claim 1, in which said lamella packet includes lateral backing plates.

3. The trunnion bearing segment according to claim 2, in which a hydrostatic fluid relief is provided proximate said lamella packet and backing plates.

4. The trunnion bearing segment according to claim 1, in which said center support is arranged sideways beside the lamella in the piston space.

5. The trunnion bearing segment according to claim 1, in which a center support engaging said lamella packet rests in said housing means via a collar supported by bearings.

6. The trunnion bearing segment according to claim 1, in which said bearing shell is wrapped around a supported peripheral area of the trunnion.

7. The trunnion bearing segment according to claim 5, in which the center support, where engaging said lamella packet, has a rectangular shape with cross-sectional dimensions matching those of the lamella, with the center section being somewhat longer than the lamella that are in direct contact therewith.

8. The trunnion bearing segment according to claim 5, in which the center support is adjustable by a spindle.

9. The trunnion bearing segment according to claim 8, in which the center support, where engaging said lamella packet, has a rectangular shape with cross-sectional dimensions matching those of the lamella, with the center section being somewhat longer than the lamella that are in direct contact therewith.

10. The trunnion bearing segment according to claim 8, in which proximate the center support said lamella packet is provided with shorter lamella aligned with the other lamella of said lamella packet at the bearing shell.

11. The trunnion bearing segment according to claim 8, in which the center support completely subdivides the lamella packet in a direction transverse to the bearing axis.

12. The trunnion bearing segment according to claim 6, in which a hydrostatic fluid relief is provided proximate said lamella packet.

13. The trunnion bearing segment according to claim 5, in which proximate the center support said lamella packet is provided with shorter lamella aligned with the other lamella of said lamella packet at the bearing shell.

14. The trunnion bearing segment according to claim 13, in which the center support, where engaging said lamella packet, has a rectangular shape with cross-sectional dimensions matching those of the lamella, with the center section being somewhat longer than the lamella that are in direct contact therewith.

15. The trunnion bearing segment according to claim 5, in which the center support completely subdivides the lamella packet in a direction transverse to the bearing axis.

16. The trunnion bearing segment according to claim 15, in which a hydrostatic fluid relief is provided proximate said lamella packet.

17. The trunnion bearing segment according to claim 5, in which the center support is adjustable through a separate spindle having a collar.

18. The trunnion bearing segment according to claim 5, in which a hydrostatic fluid relief is provided proximate said lamella packet.

19. The trunnion bearing segment according to claim 1, in which a hydrostatic fluid relief is provided proximate said lamella packet.

20. The trunnion bearing segment according to claim 1, in which the center support, where engaging said lamella packet, has a rectangular shape with cross-sectional dimensions matching those of the lamella, with the center section being somewhat longer than the lamella that are in direct contact therewith.

* * * * *